United States Patent

[11] 3,631,270

[72] Inventor James J. Heinemann
San Jose, Calif.

[21] Appl. No. 94,809
[22] Filed Dec. 3, 1970
[45] Patented Dec. 28, 1971
[73] Assignee GTE Automatic Electric Laboratories Incorporated

[54] ACTIVE ALL-PASS NETWORK FOR PHASE EQUALIZERS
6 Claims, 3 Drawing Figs.

[52] U.S. Cl. .......... 307/295, 307/233, 307/271, 328/153, 328/140
[51] Int. Cl. .......... H03k 1/16
[50] Field of Search .......... 325/458, 459, 460; 328/112, 113, 105, 152, 153, 154, 140, 223; 307/233, 271, 295

[56] References Cited

UNITED STATES PATENTS

| | | | |
|---|---|---|---|
| 3,281,693 | 10/1966 | Zydney | 307/233 |
| 3,299,284 | 1/1967 | Hough | 307/233 |
| 3,231,824 | 1/1966 | Drapkin | 307/295 |
| 3,305,739 | 2/1967 | Muskovac et al. | 307/295 |

*Primary Examiner*—Donald D. Forrer
*Assistant Examiner*—R. E. Hart
*Attorneys*—K. Mullerheim, Leonard R. Cool and Russell A. Cannon and Theodore C. Jay, Jr.

ABSTRACT: An all-pass system particularly adapted for equalizing group delay distortion in wide band communication systems. Two common emitter stages having adjustable resonant circuits are arranged in parallel to receive a single input and to linearly combine the outputs of the stages. One stage is wide band and the other is frequency selective and the output of the selective stage is twice the amplitude of the wide band stage and phase inversion is provided such that the outputs of the two stages are 180° apart.

INVENTOR
JAMES J. HEINEMANN

BY Cyril A Krenzer

ATTORNEY

INVENTOR.
JAMES J. HEINEMANN
BY Cyril A. Krenzer
ATTORNEY

ACTIVE ALL-PASS NETWORK FOR PHASE EQUALIZERS

BACKGROUND OF INVENTION

Wide band communication systems require equalization of envelope delay which results from nonlinear phase-frequency characteristics of band-limiting structures within the system. Correction of group delay distortion is accomplished with what is normally termed an "all-pass" network or system. With regard to such systems it is noted that conventional electric or electronic networks have a "phase vs. frequency" characteristic which is related to the "amplitude vs. frequency" characteristic and normally it is difficult if not impossible to alter one of these characteristics without modifying the other. On the other hand an all-pass network has a particular "phase vs. frequency" characteristic but has an amplitude characteristic that is independent of change in frequency. Thus the addition of one or more all-pass networks to conventional networks only alters the "phase vs. frequency" characteristic so that it is possible to "equalize" any particular network or system by altering the phase characteristic thereof by addition of successive all-pass networks until the desired overall characteristic is attained.

Normally all-pass networks are formed of lattice of bridged T circuits. Such circuits incorporate at least four or five components and the parameters must have particular values to establish a desired phase-frequency characteristic and a constant amplitude-frequency characteristic. Such single networks provide phase equalization for relatively narrow bandwidths for rather simple delay distortion characteristics. To equalize for wide bandwidths and/or complex delay distortion characteristics, a number of these networks must be cascaded. Further, in order to adjust or change either of the characteristic parameters, it is necessary to readjust all of the component values. It is known to be a tedious and time-consuming operation to carry out the above-noted adjustments.

There has also been developed an all-pass network which is an active device and in which the number of components whose value must be adjusted to change the phase characteristic is minimized. In such a system or device it is possible to achieve a constant amplitude vs. frequency characteristic for a single section wherein only a single capacitor and inductor need be adjusted to change the center band frequency and slope of the phase characteristic. It is, however, often necessary to cascade devices of this type and careful analysis thereof shows that a multisection equalizer of this type contributes to noise in the system.

SUMMARY OF INVENTION

The present invention provides an active broadband all-pass network comprising two active paths or stages arranged in parallel combination to receive a single input and produce two outputs which are linearly combined as the output of the network. A first stage of this system is broad band or wide band and the other stage is frequency selective. The two stages comprise common emitter transistors and in a preferred embodiment of the invention the base of each transistor is connected to the outputs of a signal-dividing circuit receiving the single input of the system. The frequency and phase response of each of the stages is controlled by a network in the emitter circuit of the transistor. The output of the selective stage is arranged to be twice the output of the wide band stage at the resonant frequency or frequencies and phase inversion is provided such that the phase of the output of the two stages are 180° apart at the resonant frequency or frequencies of the selective network.

DESCRIPTION OF FIGURES

The present invention is illustrated as to particular preferred embodiments thereof in the accompanying drawings wherein.

DESCRIPTION OF PREFERRED EMBODIMENTS

Figure 1:
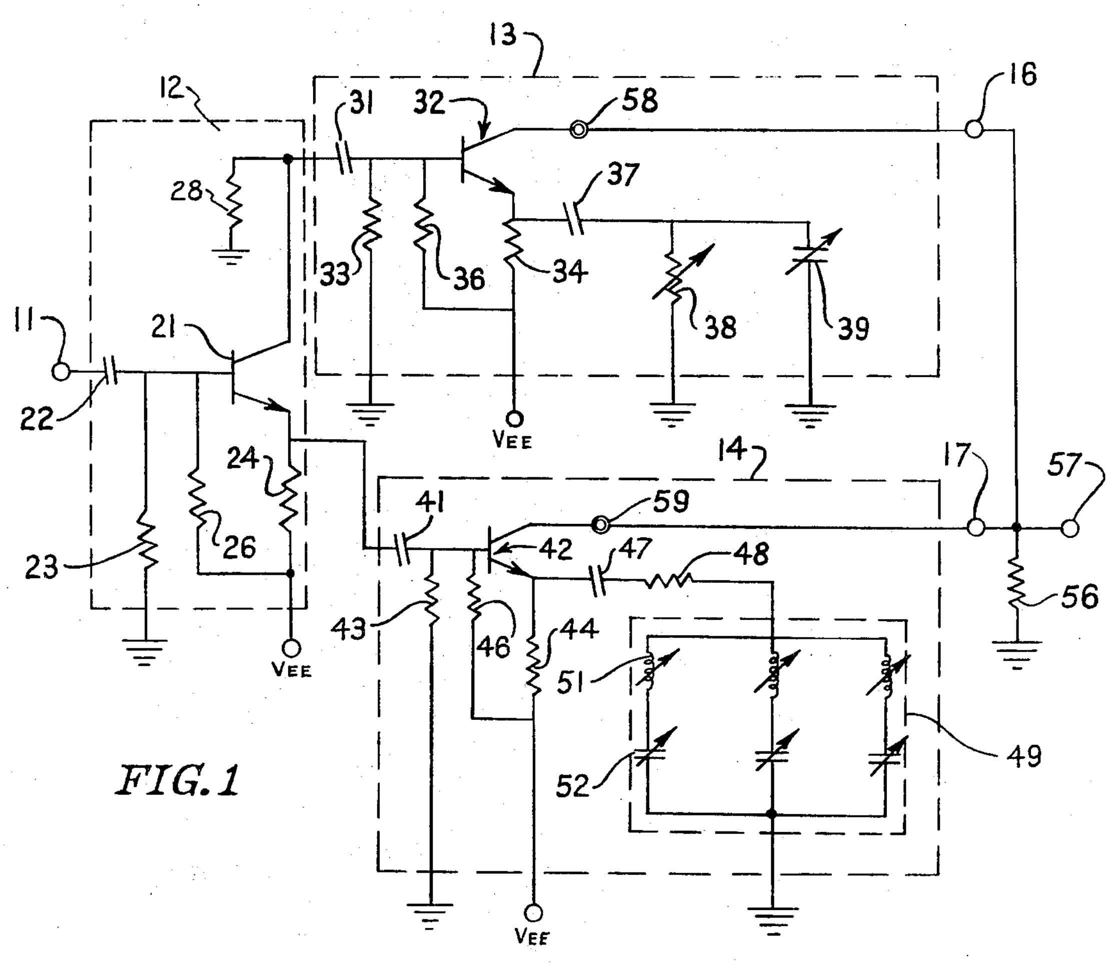
FIG. 1 is a circuit diagram illustrating the preferred embodiment of the present invention incorporating multiple sections in the selective stage thereof.

Referring first to FIG. 1, there will be seen to be generally illustrated an input terminal 11 connected to an input circuit 12 that in turn has the output thereof connected to a pair of parallel connected active stages 13 and 14, with such stages having output terminals 16 and 17 respectively. The input circuit 12 in this embodiment is a split-load phase inverter incorporating a transistor 21 having the base thereof connected through a capacitor 22 to the input terminal 11 with a dropping resistor 23 connected between the base and ground. The emitter of the transistor 21 is connected through a resistor 24 to a power supply terminal applying emitter voltage designated as $V_{EE}$ and a base resistor 26 connects the base of the transistor 21 across the base emitter junction and resistor 24. The gain of the emitter output of transistor 21 is assumed to be unity and the collector gain is hereinafter termed $-A_1$, as further defined below.

The collector of the phase inverter transistor 21 is coupled through a capacitor 31 to the base of a transistor 32 in the wide band stage 13. In this stage the transistor 32 is connected similarly to the transistor 21 of stage 12 in that the base of the transistor is grounded through a resistor 33, the emitter of the transistor is connected through a resistor 34 to a power supply $V_{EE}$ and a resistor 36 is connected from this power supply to the base of the transistor. In this stage the emitter of the transistor 32 is coupled through a capacitor 37 to a circuit comprising a parallel combination of a variable resistor 38 and variable capacitor 39, both connected to ground. The collector of the transistor 32 in stage 13 is connected to the output terminal 16 of the stage.

With regard to the frequency selective stage 14, the emitter of the phase inverter transistor 21 is connected through a capacitor 41 to the base of a transistor 42 that is in turn grounded through a resistor 43. The emitter of transistor 42 in stage 14 is connected through a resistor 44 to a power supply $V_{EE}$ and a resistor 46 connects the base of this transistor to such power supply. The emitter of the transistor 42 in stage 14 is also connected through a series combination of a capacitor 47 and resistor 48 to a multisection network 49 that is in turn grounded. Substantially any number of resonant circuits or sections may be provided in the network 49 in order to achieve the desired phase-frequency characteristic of the overall system. As illustrated, the network 49 includes three sections connected in parallel and each comprising a variable inductor 51 and variable capacitor 52. The collector of transistor 42 is connected to the output terminal 17 of the selective stage 14.

The output terminals 16 and 17 of the system stages 13 and 14 are both directly connected through a common load resistor 56 to ground and to a single output terminal 57 for the system. Also there are preferably provided ferrite beads 58 and 59 disposed one in each of the connections from the collectors of transistors 32 and 42 to the output terminal 16 and 17 in order to improve high-frequency stability of the stages.

Consideration is now given to the characteristics of the system described above and in the following discussion it is noted that individual circuit elements are identified by the character thereof, i.e., R for resistance, etc., with the appropriate subscript in terms of the numbers employed on the elements in FIG. 1. It is first noted that the collector gain of transistor 21 herein denominated as $-A_1$ is equal to the parallel combination of $R_{28}$ (resistance of collector of transistor 21 to ground), $R_{33}$ and $R_{36}$ divided by the parallel combination of $R_{24}$, $R_{43}$ and $R_{46}$. It is assumed that the collector currents are equal to the emitter currents and furthermore that the emitter bias resistors $R_{34}$ and $R_{44}$ are sufficiently large to be neglected in network calculations. With regard to the first or wide band stage 13 of the circuit, it is noted that the capacitor $C_{39}$ compensates for the gain thereof for variation or "roll-off" with frequency. The collector current $I_{13}$ may be represented in terms of the voltage $V_{13}$ applied to this stage and circuit constants as follows:

$$I_{13}=\frac{V_{13}}{R_{38}+R_{E32}} \quad (1)$$

With regard to the second or selective stage 14, it is noted that the capacitor $C_{47}$ is provided to tune out emitter inductance and may, in fact, be omitted if only a single section tuned circuit is incorporated in this second stage. The collector current $I_{14}$ for the second stage may be written in terms of the voltage $V_{14}$ applied to the stage as follows:

$$I_{14}=\frac{V_{14}}{R_{48}+R_{E42}+Z_{49}} \quad (2)$$

It is noted in this respect that the term $Z_{49}$ is the impedance of the tuned network 49 and furthermore that $Z_{49}$ is a pure reactance function.

It is noted that the output currents of the two stages of the present system are applied through a common load resistor 56 and thus the output voltage $V_{OUT}$ at terminal 57 may be written as:

$$V_{OUT}=R_{56}(I_{13}+I_{14}) \quad (3)$$

Substituting for $I_{13}$ and $I_{14}$ gives:

$$V_{OUT}=R_{56}\left[\frac{V_{13}}{R_{38}+R_{E32}}+\frac{V_{14}}{R_{48}+R_{E42}+Z_{49}}\right] \quad (4)$$

It will be recalled that collector gain of the phase inverter transistor 21 has been stated to be $-A_1$ and assuming that the emitter gain is equal to 1, the relationship of first and second stage voltages is then:

$V_{13}=-A_1V_{14}$ (5) Substituting for $V_{13}$ in equation (4) above and transposing as required yields the relationship:

$$V_{OUT}=\frac{R_{56}V_{14}A_1}{(R_{E32}+R_{38})}\left[\frac{(R_{E32}+R_{38})/A_1-(R_{E42}+R_{48})-Z_{49}}{(R_{E42}+R_{48})+Z_{49}}\right] \quad (6)$$

In order for the circuit to satisfy the all-pass condition, i.e., for the amplitude-frequency characteristics to be constant, it is then necessary for:

$$\frac{R_{E32}+R_{38}}{A_1}-(R_{E42}+R_{48})=R_{E42}+R_{48}$$

which may be rewritten as:

$$\frac{R_{E32}+R_{38}}{A_1}=2(R_{E42}+R_{48}) \quad (7)$$

and from this equation (6) may be rewritten as:

$$V_{OUT}=\frac{R_{56}V_{14}A_1}{(R_{E32}+R_{38})}\left[\frac{(R_{E42}+R_{48})-Z_{49}}{(R_{E42}+R_{48})+Z_{49}}\right] \quad (8)$$

It will be seen that the phase angle Φ is given by the relationship:

$$\phi=2\ \arctan\frac{(Z_{49})}{(R_{E42}+R_{48})}$$

From the foregoing it will be apparent that when the gain of the selective stage at resonance is twice the gain of the wide band stage, equation 7 will be satisfied. Inasmuch as the term $$\frac{R_{56}V_{14}A_1}{R_{E32}+R_{38}}$$

is in itself wide band, it will be seen to be unaffected by change in frequency. Furthermore, inasmuch as $R_{E42}$ and $R_{48}$ are resistive and $Z_{49}$ is a pure reactance function, the term $$\frac{(R_{E42}+R_{48})-Z_{49}}{(R_{E42}+R_{48})+Z_{49}}$$

has a constant magnitude with frequency. Therefore, equation (8) above does have a constant amplitude with variations of frequency and variations of $Z_{49}$ so that the circuit of FIG. 1 does thus have a constant amplitude versus frequency characteristic with a variable phase versus frequency characteristic which is controllable by varying the inductor or inductors and capacitor or capacitors of the network 49. As a practical matter the assumptions set forth are appropriate. The variable nature of resistor 38 and capacitor 39 in the first stage of the system make it easy to adjust the values thereof to optimize the all-pass relationship and also the value of capacitor 47 may be set to minimize the effect of emitter inductance of the transistor 42. It is also noted that appropriate calculations can be made to determine the element values for each tuned circuit of the network 49.

Figure 2:
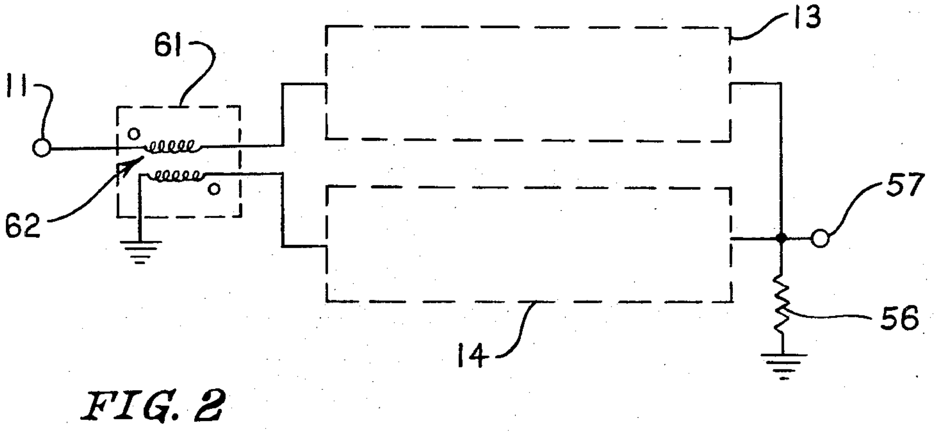
FIG. 2 is a circuit diagram of a system in accordance with the present invention and employing an alternative input circuit from the embodiment of FIG. 1.

The present invention admits of various alternatives within the general criteria set forth above. Thus, for example, the embodiment of the present invention illustrated in FIG. 2 incorporates the two stages 13 and 14 to which there are applied as inputs a split signal with phase inversion, but in this instance through an alternative input circuit 61. As shown in FIG. 2, the input terminal 11 is connected to one end of a first side of a transformer 62 having the other end thereof connected as the input to the wide band stage 13. The other side of the transformer 62 has a first end thereof electrically grounded and a second end thereof connected to the input of the selective stage 14. As indicated in the drawing the two outputs of the transformer 62 are out of phase, i.e., in phase opposition, and it is furthermore noted that the transformer ratio is such that the signal applied to the selective stage 14 is twice the amplitude of the signal applied to the stage 13. This then fulfills the requirement set forth above and it is again noted that the stages 13 and 14 are common emitter stages as described in connection with FIG. 1. Again in this embodiment the output of the two stages are applied through a single load resistor 56 so as to provide linear combination of the outputs of the two stages at the output terminal 57.

Figure 3:
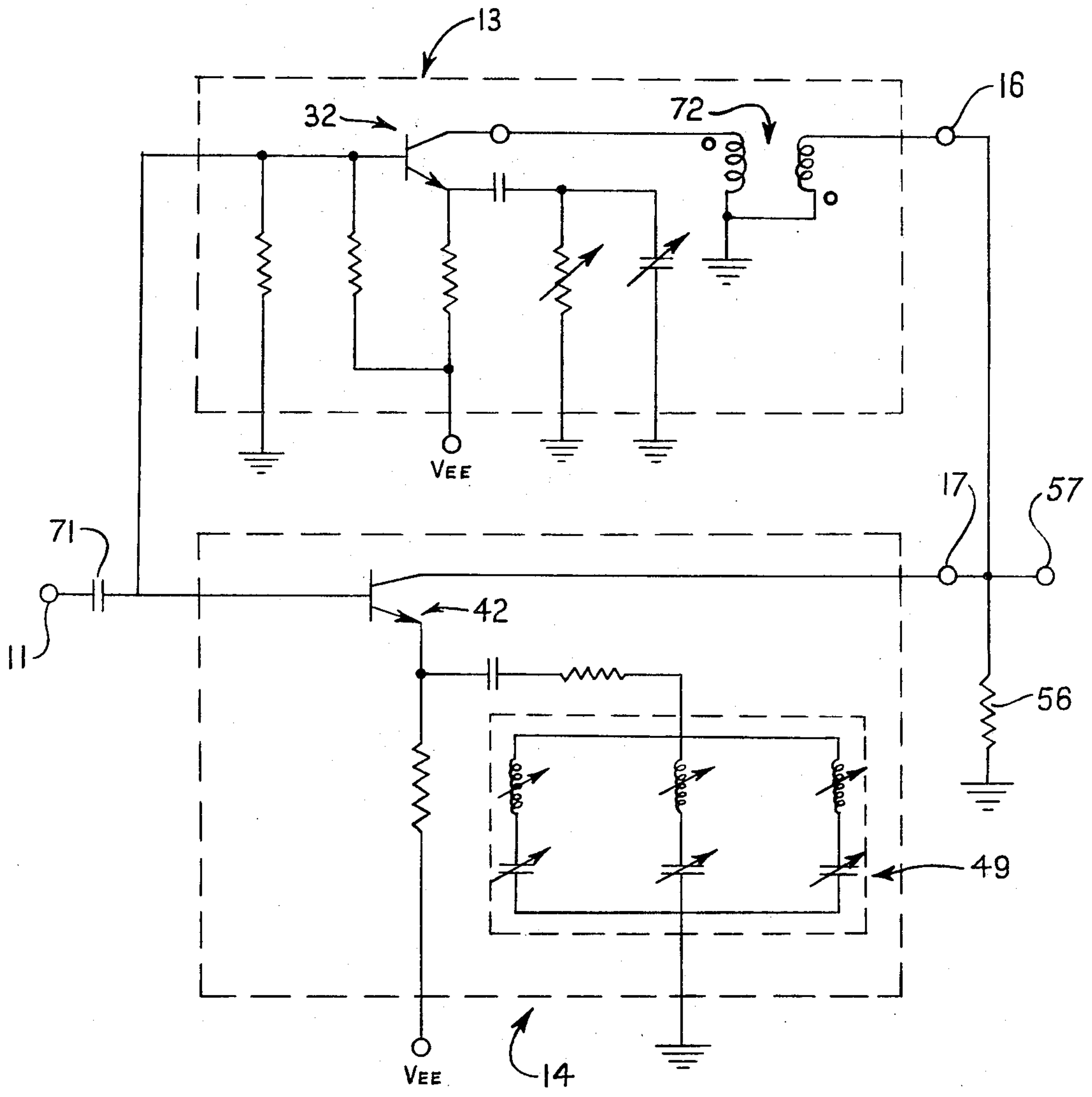
FIG. 3 is a circuit diagram of yet another embodiment of the present invention incorporating alternative circuitry for establishing the requisite phase relationship and gain of the two stages of the present invention.

A further embodiment of the present invention is illustrated in FIG. 3 and, referring thereto, it will be seen that the system illustrated also incorporates a first wide band stage 13 and a second selective stage 14. In general the stages 13 and 14 are the same as the stages illustrated in FIG. 1 described above and to this extent the elements and connections to the stages are identified by the same numerals as in FIG. 1. In this embodiment of the present invention the signal applied to the input terminal 11 is coupled through a capacitor 71 directly to the bases of the common emitter transistors 32 and 42 of the two stages. Thus the same signal is applied to each stage; however, with regard to the output current of each stage, it is noted that the wide band stage 13 is provided in the collector circuit thereof with a transformer 72. This transformer 72 is appropriately wound so that the output side thereof produces one-half the current flowing through the input side and, as indicated in FIG. 3, the output of the transformer is out of phase with the input. This then provides for achieving the necessary relationship of out-of-phase operation of the two stages 13 and 14 and the maintenance of the output of the selective stage being twice the output of the wide band stage.

It is to be appreciated that the calculations and relationships set forth above are also applicable to the circuit of FIG. 3 with the modification that the amplification factor is applied to the output rather than the input. Furthermore, it will be appreciated that it does not make any difference whether or not the signals are inphase or out-of-phase as operated upon by the separate stages, but to the contrary, the requirement is only applicable to the output of the stages.

There has been described above certain preferred embodiments of the present invention providing a truly all-pass system wherein the phase versus frequency characteristic may be controlled without modification of amplitude versus frequency characteristic. Such a system is, as noted above, particularly useful for equalization of envelope delay or correction of group delay distortion in wide band communication systems. In particular, prior art problems of cascading all-pass networks are entirely overcome hereby. The tedious adjustment problems of passive networks is precluded herein, and the errors inherent in cascaded active networks are excluded from the present invention.

It will be appreciated that various modifications and alterations in the present invention as illustrated and described are possible within the scope of the present invention.

What is claimed is:

1. An all-pass system for phase adjustment comprising a. input means adapted to receive input signals, b. first and second stages connected in parallel to said input means for receiving signals therefrom and each comprising a common emitter transistor circuit, c. the first of said stages being wide band and the second of said stages being frequency selective with at least one adjustable resonant circuit in the emitter circuit of said second stage, d. means establishing the output of said second stage at twice the amplitude of the output of said first stage and maintaining the outputs of the two stages out of phase, and e. a common load connected to the outputs of said first and second stages for linear addition of such outputs as a single phase adjusted output of said system as adjusted by the setting of said second stage resonant circuit.

2. The all-pass system of claim 1 further defined by said means (d) being incorporated into said input means (a) as a split load phase inverter transistor circuit.

3. The all-pass system of claim 1 further defined by the input means (a) including the means (d) and comprising a transformer having one winding connected between an input terminal and one of said stages and the other winding being oppositely wound for reversing polarity and connected to the other of said stages, the turns ratio of said windings establishing said amplitude relationship.

4. The all-pass system of claim 1 further defined by said means (d) comprising a transformer connected to the output of one of said stages and having oppositely poled windings for said phase reversal and a turns ratio establishing said amplitude relationship.

5. The all-pass system of claim 2 further defined by the value of resistors in the input transistor circuit being in predetermined relation to the value of resistors in the first stage transistor circuit to apply one half the amplitude signal to the first stage as is applied to the second stage.

6. The all-pass system of claim 1 further defined by said second stage having a plurality of *n* resonant circuits and the phase difference between the second stage output and the first stage output being 180°.

* * * * *